Aug. 21, 1962 SHIGETSUNE IIKURA 3,050,269

REEL APPARATUS

Filed Dec. 24, 1958 2 Sheets-Sheet 1

Inventor
Shigetsune Iikura by Hill, Sherman, Meroni, Gross & Simpson Attys.

Inventor
Shigetsune Iikura
by Hill, Sherman, Meroni, Gross & Simpson Attys.

3,050,269

REEL APPARATUS

Shigetsune Iikura, Tokyo, Japan, assignor to Sony Kabushikikaisha (Sony Corporation), Tokyo, Japan, a corporation of Japan Filed Dec. 24, 1958, Ser. No. 782,769
Claims priority, application Japan Jan. 11, 1958
4 Claims. (Cl. 242—71.8)

This invention relates to a reel apparatus and more particularly to such a reel or reel apparatus for taking up or supplying a carrier such as a movie film or a magnetic recording tape.

An object of this invention is to provide a reel apparatus in which a movie film or a magnetic recording tape is repeatedly and easily operated without rewinding.

Another object of this invention is to provide a reel apparatus in which the reel has support means for supporting the reel in an inclined position with respect to its normal position when supported for rotation about its axis, so that a carrier can be easily picked out through a window formed in a side plate of the reel and supplied to a cooperating reel without torsion on the reel and without requiring the provision of guide rollers. Magnetic tape and photographic movie film carry latent information of an audio or a visual nature and these and similar elements may for convenience herein be termed carriers and this term will be used interchangeably with the other terms for the carriers.

A further object of this invention is to provide a simple reel in which an endless carrier can be drawn out from the inside of the reel through a window formed on a side plate of the reel and supplied again to the outside of the same reel.

A still further object of this invention is to provide a reel apparatus in which a user of the reel apparatus can easily operate the supply and takeup of an ordinary film of a usual movie projector and of a magnetic tape of a usual magnetic recorder without any special accessory.

Other objects, features and advantages of this invention will be more apparent from the following detailed description taken in connection with the accompanying drawing in which.

Figure 1:
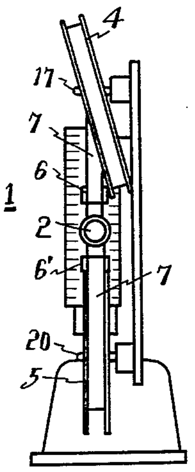
FIG. 1 is a front view of a movie projector to which a reel apparatus constructed according to this invention is applied.
Figure 2:
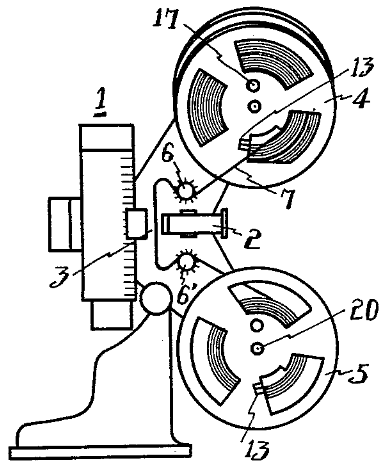
FIG. 2 is a side view of the movie projector shown in FIG. 1.

Referring to FIGS. 1 and 2 of the drawing, 1 represents generally a movie projector. 2 designates a lens system, 3 is an aperture, 4 a supply reel and 5 a take up reel, 6 and 6' are sprocket wheels and 7 a movie film or a carrier.

Figure 3:
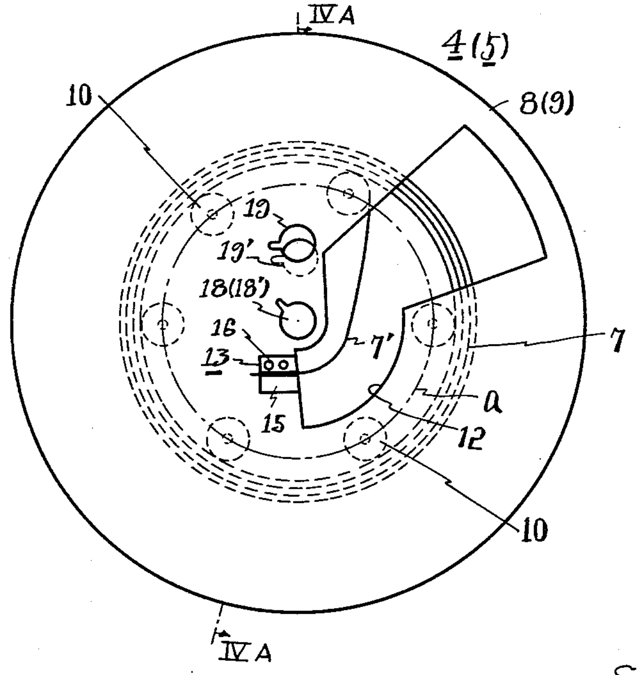
FIG. 3 is a front view of a reel embodying this invention.
Figure 4:
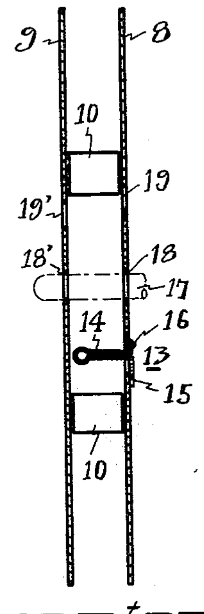
FIG. 4 is a sectional side view of the reel taken along the line IVA—IVA of FIG. 3.

In accordance with this invention at least one of said reels, for example the upper reel 4 is constructed specially as shown in FIGS. 3 and 4. That is, the reel 4 has a pair of oppositely disposed side plates 8 and 9 for restricting the side edges of the carrier 7 and a plurality of rollers 10 arranged on a concentric circle *a* between the side plates so that the carrier 7 is wound on the outer sides of the rollers.

In order to pick out the inner end 7' of the carrier 7 which is wound inside the reel, along the radial direction of at least one of the side plates is formed a window 12 having a width large enough to insert fingers.

At the inner end of the window 12 is mounted a carrier holder 13 which has a mouth to be opened to the outside of the side plate so that the inner end 7' of the carrier 7 is transversely put into the carrier holder 13. The carrier holder 13 is made by bending a resilient band such as a thin plate made of plastics or metal plate in the form of U-shape, which U-shaped piece, in turn, is put into a slit 15 communicated to the inner end of the window 12, one end of the U-shaped piece being secured to the inner side edge of the slit by means of a screw 16 and the other end of the U-shaped piece being free so as to close owing to its resilience.

Instead of providing the above U-shaped piece, a clip may be secured on the outside of one of the side plates 8 and 9 to catch the end of the carrier.

The inner free end of the carrier is transversely caught by a mouth formed by both ends of the U-shaped piece. It is preferable that the inner walls of the mouth of the carrier holder are made with a rough surface so that the end of the carrier is accurately engaged with the rough surfaces.

The side plates 8 and 9 are provided respectively with central apertures 18 and 18' for receiving a shaft 17 and respectively with eccentric apertures 19 and 19' which are somewhat discrepant as best shown in FIG. 3. In other words, the central apertures 18 and 18' are positioned on the axis of the side plates 8 and 9 so that when a shaft is inserted into the central apertures the plates will be at right angles to the shaft. The eccentric apertures 19 and 19' are discrepant or positioned eccentric with respect to each other relative to the shaft axis so that when the shaft is inserted into the eccentric apertures, the plates will be at an angle to the plane which is at right angles to the central axis of the plates. By virtue of this discrepancy of the apertures 19 and 19' the side plates 8 and 9 are inclined with respect to the vertical plane when the plates are engaged with a horizontal shaft 17 as shown in FIG. 1. According to this arrangement a carrier is supplied through the window 12 from the reel to the sprocket wheel 6, aperture 3 and the other sprocket wheel 6' without guide rollers and the carrier thus supplied can travel out naturally to the take up reel 5 without any undesired torsion on the reel 4.

Another way to incline the supply reel 4 for unwinding the carrier is to position the discrepant aperture 19' offset a short distance from the central aperture 18' and the shaft is then inserted through the opposite central aperture 18 and the discrepant aperture 19' to tilt the position of the reel on the shaft 17.

Now I will explain the operation of the reel or reel apparatus according to this invention applied to a movie projector. The reel apparatus is set as shown in FIGS, 1, 2 and 3. The inner end 7' of a film is picked up and drawn out by fingers through the window 12 of the upper supply reel 4. In this case the film 7 can be supplied from the reel 4 to the lower take up reel 5, owing to the inclination of the reel 4. It will be noted in this case that the reel 4 stands still and a series of rollers 10 is rotated with the movement of the carrier 7.

Figure 5:
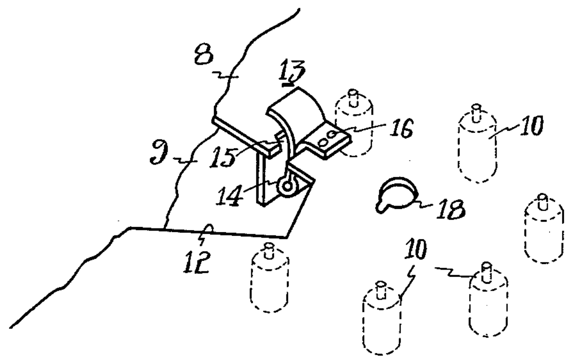
FIG. 5 is a detailed perspective view of one part of a reel according to this invention.

The travel of the film 7 from reel 4 to 5 will be accurately and smoothly performed without any torsion which will have been encountered in an ordinary reel apparatus in case of the lack of an adequate guide roller arrangement. It will also be noted that the lower reel 5 is set perpendicularly by engaging the shaft 20 with the central apertures 18 and 18' which are aligned with each other and the film is wound freely on the lower reel 5 from its outside. Then the inner end of the wound film is pulled out by fingers through the window 12 and put transversely into the mouth of the carrier holder or clip as shown and illustrated in FIG. 5. Thereafter the film is continuously taken up onto the outer sides of the roller 10 so as to pile layers spirally thereon, as with an ordinary reel.

Now, the take up reel 5 thus operated is set on the shaft 17 in the inclined position instead of the reel 4, then the film is pulled out and then fed from the reel 5 to another reel set on the lower shaft 20 in substantially the same manner hereinbefore described so that the film is used for reprojection without repeating rewinding.

The supply operation of the film can be smoothly done without resistance owing to the roller arrangement 10. Moreover, it will be recognized that the film also travels without damage between supply and take up reels. Besides, according to this invention since the reel can be set in inclined position by means of the discrepant apertures 19 and 19′ the pull out operation of the film can be done easily and smoothly. If the lower edge of the side plate 9 of an inclined reel touches with the supporting parts of the movie projector the reel is controlled by the brake action of the contact so as to restrain swinging of the reel.

It will be appreciated that a reel constructed according to this invention can be used in the same manner as an ordinary reel. It will also be understood that an ordinary reel which can be used as the lower reel 5 may operate with the reel 4 according to this invention.

It will be noted that only one reel as shown in FIGS. 3 and 4 is necessary for operating an endless carrier. Namely, the inner end of the carrier which is pulled out through the window 12 from the inner side of the reel can be supplied to and laid on the outer surface of the same carrier which is wound on the same reel so that an endless operation can be continued.

Although I have mainly explained the reel according to this invention in connection with an application for a movie projector, it may be adapted for the supply and take up of a magnetic tape used in a magnetic recorder.

Figure 6:
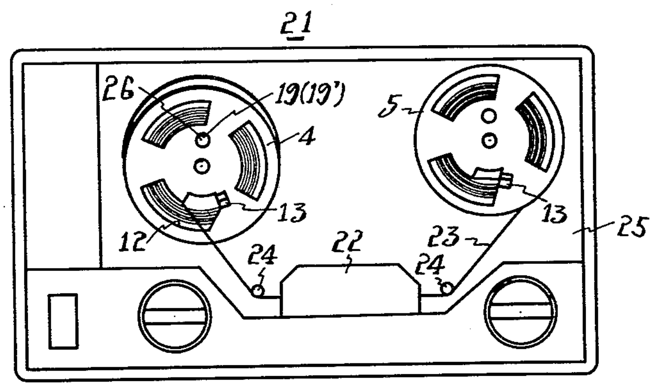
FIG. 6 shows a plan view of a magnetic tape recorder to which reel apparatus constructed according to this invention is applied.

FIG. 6 shows a magnetic recorder to which the reel apparatus according to this invention is adapted; 21 shows generally a magnetic recorder; 4 is a supply reel; 5 is a take up reel; 22 illustrates a magnetic head cover and 23 a magnetic tape; and 24 designates guide rollers of the tape. In this case although a panel 25 on which both the reels 4 and 5 are attached is disposed in the horizontal plane the supply reel 4 is supported at an adequately inclined position with respect to the horizontal plane by inserting a vertical shaft 26 through the discrepant apertures 19 and 19′. The inner end of the tape 23 is pulled out through the window 12 of the supply reel 4 and travels along the magnetic head and is wound into the take up reel 5. In this example the supply and take up operation of the magnetic tape will be easily and smoothly performed owing to the inclination of the reel 4 even if the tape is pulled out from the center portion of the reel, as has been already hereinbefore referred to. After a record is thus done, for example, the reproducing can be easily completed by only changing the positions of the supply reel 4 and the take up reel 5, the magnetic tape being picked up from the center portion of the reel which is now set at the supply side without rewind, as already explained. If the window is formed not only on the side plate 8 but also on the opposite side plate 9 a second sound track of the same magnetic tape can be used for both recording and reproducing without rewinding when the reels are turned over for the same operation as above referred to. It will be easily understood in a magnetic recorder that an endless operation of a magnetic tape may be continued by the use of only one reel according to this invention, as has been described in connection with the movie projector. The features and advantages of this invention which have been already explained in connection with a movie projector are equally obtained in applying to a magnetic recorder.

While I have explained a particular embodiment of my invention, it will be understood, of course, that we do not wish to be limited thereto since many modifications may be made and I, therefore contemplated by the appended claims to cover any such modifications as fall within the spirit and scope of my invention.

What I claim is:

1. A reel comprising a pair of oppositely disposed side plates for restricting the side edges of a film, said side plates being provided with central apertures for receiving a shaft and mounting the reel in a first plane at right angles to said shaft, at least one of said side plates being provided with a window which is formed along the radial direction of the side plate and which has a width large enough to insert fingers so that the inner end of the film wound on the reel can be pulled out through said window, means between the plates for supporting the film, said side plates also being provided with apertures positioned eccentric with respect to each other and to the axis of the central apertures to be supportingly received by a shaft so that the shaft may be inserted therethrough to incline said side plates with respect to said first plane in such a manner that the film can be pulled out without much torsion through the window when the side plates stand still by the eccentric effect, and a film holder in said window between said plates having a film receiving mouth facing axially outwardly so that the inner end of the film may be inserted axially therein.

2. A reel comprising a pair of oppositely disposed side plates for restricting the side edges of a film, said side plates being provided with central apertures for receiving a shaft and mounting the reel in a first plane at right angles to said shaft, at least one of said side plates being provided with a window which is formed along the radial direction of the side plate and which has a width large enough to insert fingers so that the inner end of the film wound on the reel can be pulled out through said window, means between the plates for supporting the film, said side plates also being provided with apertures positioned eccentric with respect to each other and to the axis of the central apertures to be supportingly received by a shaft so that the shaft may be inserted therethrough to incline said side plates with respect to said first plane in such a manner that the film can be pulled out without much torsion through the window when the side plates stand still by the eccentric effect, a film holder in said window between said plates having a film receiving mouth facing axially outwardly so that the inner end of the film may be inserted axially therein, said holder being U-shaped and formed of resilient material, and means defining a slit in said one plate adjacent the window with one end of the holder secured to the plate at the edge of the slit and the other end of the holder being free of restraining attachments.

3. A reel comprising oppositely disposed side plates for restricting the side edges of a film or the like, each of said side plates being provided with a central aperture for receiving a shaft and mounting the reel in a first plane at right angles to said shaft, at least one of said side plates being provided with a window which is formed along the radial direction of the side plate and which has a width large enough to insert fingers so that the inner end of the film wound on the reel can be pulled out through said window, and each of said plates also being provided with an additional eccentric aperture, each of which is misaligned with respect to the other, said eccentric and central apertures being of the same size to be selectively supportingly received by a shaft so that the shaft may be inserted to support the reel, said eccentric apertures positioned to incline said side plates with respect to said first plane in such a manner that the film can be pulled out and the side plates remain stationary.

4. A reel comprising a pair of oppositely disposed side plates for restricting the side edges of a film, said side plates being provided with aligned central apertures for receiving a shaft and mounting the reel in a first plane at right angles to said shaft, at least one of said side plates being provided with a window which is formed along the radial direction of the side plate and which has a width large enough to insert fingers so that the inner end of the film wound on the reel can be pulled out through said window, a plurality of guide rollers rotatably mounted between the plates and disposed on a concentric circle with respect to the central apertures, and said side plates also being provided with apertures positioned eccentric with respect to each other and to the axis of the central apertures to be supportingly received by a shaft so that the shaft may be inserted therethrough to incline said side plates with respect to the first plane in such a manner that the film can be pulled out through the window with the side plates remaining stationary.

References Cited in the file of this patent

UNITED STATES PATENTS

| | | |
|---|---|---|
| 1,095,723 | Frisoli | May 5, 1914 |
| 1,239,504 | Millar | Sept. 11, 1917 |
| 2,107,530 | Goldberg | Feb. 8, 1938 |
| 2,475,036 | Lopez-Henriquez | July 5, 1949 |
| 2,540,897 | Lindeman | Feb. 6, 1951 |